United States Patent [19]
Alaniz

[11] 4,083,376
[45] Apr. 11, 1978

[54] TWO PIECE DOUBLE ACTING VALVE SEAT ASSEMBLY

[75] Inventor: Ruben G. Alaniz, Houston, Tex.

[73] Assignee: ACF Industries, Incorporated, New York, N.Y.

[21] Appl. No.: 732,250

[22] Filed: Oct. 14, 1976

[51] Int. Cl.² ............................................. F16K 5/22
[52] U.S. Cl. ............................... 137/246.22; 251/172
[58] Field of Search ............... 251/172; 137/246.22, 137/246.2, 246.21, 246.23

[56] References Cited

U.S. PATENT DOCUMENTS

| | | | |
|---|---|---|---|
| 3,497,177 | 2/1970 | Hulsey | 251/172 |
| 3,610,569 | 10/1971 | Reaves | 251/172 X |
| 3,617,025 | 11/1971 | Gerbic | 251/172 |
| 3,667,727 | 6/1972 | Bowden | 251/172 |
| 3,776,506 | 12/1973 | Fowler | 251/172 |

*Primary Examiner*—Harold W. Weakley

[57] ABSTRACT

A double acting valve seat assembly which includes an annular outer seat member with an annular groove around a face portion thereof and an inner seat member mounted in the annular groove. A peripheral seal around the outer seat member seals in a bottom portion of the body recesses. A peripheral seal around the inner seat member seals in the groove. A face seal on the inner seat member seals against the valve member. The position of the seals is selected such that when the flow line pressure is greater than the valve chamber pressure the seat members are urged toward the valve member, and when the valve chamber pressure is greater than the flow line pressure the seat members are urged apart with the inner seat member being urged toward the valve member and the outer seat member being urged into a bottom portion of the associated recess.

7 Claims, 5 Drawing Figures

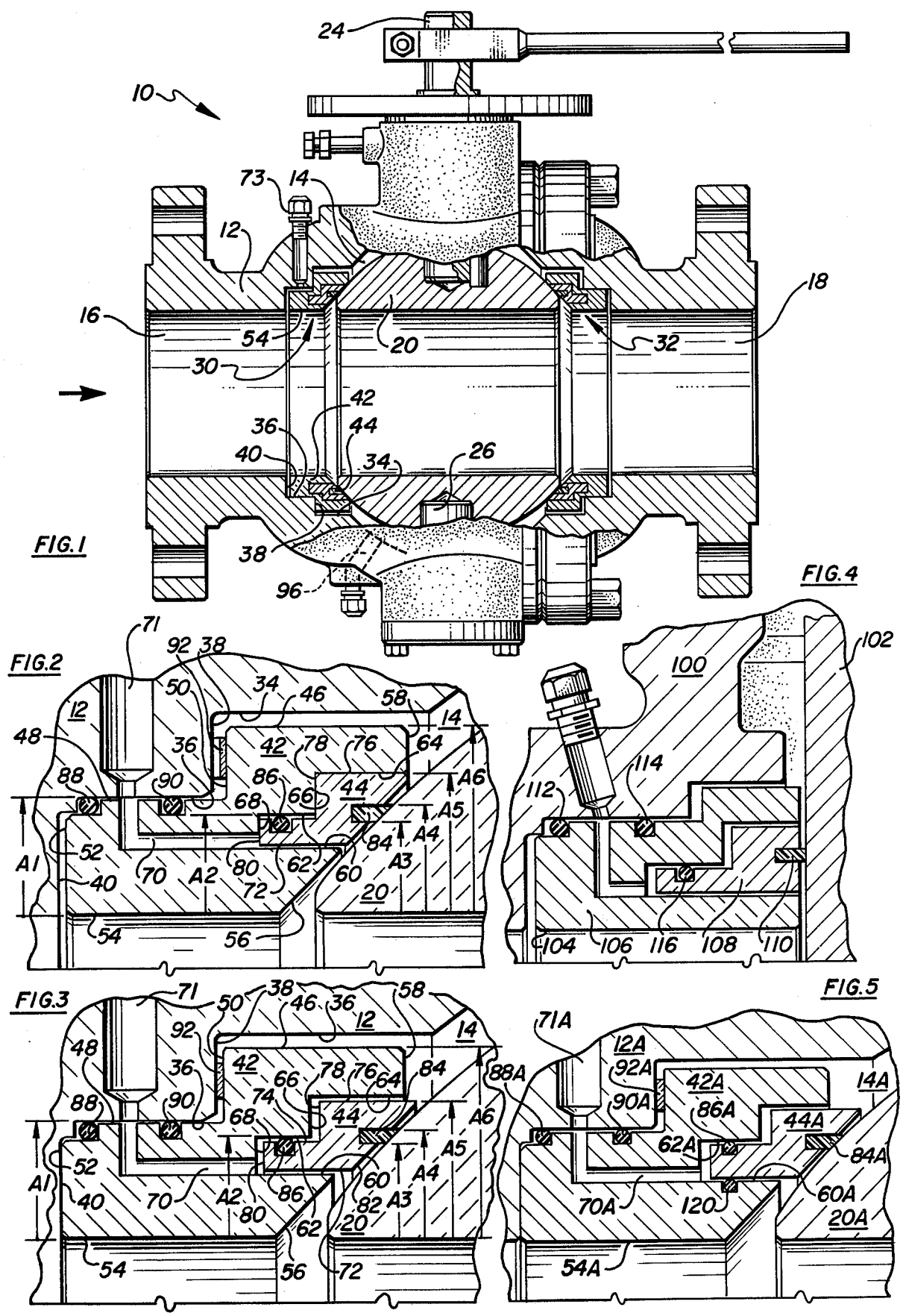

TWO PIECE DOUBLE ACTING VALVE SEAT ASSEMBLY

BACKGROUND OF THE INVENTION

This invention is directed to a so called double acting valve seat which is responsive to both flow line fluid pressure and valve body fluid pressure to effect sealing thereof. The double acting valve seat assembly of this invention is shown here in a ball valve and in a gate valve. Normally, double acting valve seats are constructed so that when the flow line fluid pressure is greater than the valve body pressure then a greater area at the rear portion of the seat assembly is exposed to the flow line fluid pressure so the entire seat assembly is urged toward the valve member. Likewise, when the body fluid pressure is greater than the flow line fluid pressure the seat assembly is so constructed that the body fluid pressure is exposed over a greater area of the rear portion of the seat assembly than on the face portion thereof so the seat assembly is urged toward the valve member by force generated because of the high body fluid pressure.

Typical prior art double acting valve seat assemblies employ a one piece construction with a pair of back face seals radially from each other and movable between two positions to provide a greater rear area which is exposed to the fluid pressure when either the flow line fluid pressure is greater than the valve body fluid pressure or when the valve body fluid pressure is greater than the flow line fluid pressure. For example, typical prior art double acting seat assemblies are shown in U.S. Pat. Nos. 3,421,733 and 3,834,664. In these prior art devices the entire seat member has to be displaced or urged toward the valve member when fluid pressure is greater on the back side of the seat. Because the entire seat assembly must be displaced a substantial fluid pressure differential is required to properly actuate the seat. For low pressure valve applications and applications where the nature of the lading is such that the seats might stick, then operation of the prior art valve seats may be impaired or prevented.

SUMMARY OF THE INVENTION

In an embodiment a two-piece, double acting valve seat assembly includes an annular outer seat member having an annular groove in a face portion thereof with an inner seat member mounted in the annular groove. A pripheral seal is provided around the outer seat member and another peripheral seal is provided around the inner seat member in the groove. A face seal on the face portion of the inner seat member seals against the valve member. Seal position, size and placement on the seat members is selected so that when flow line fluid pressure is greater than in the valve body fluid pressure then the seat members are urged together and toward the valve member. The seal position, size and placement is also made so that from that described above the seat members are displaced in opposite directions with the outer seat member being urged outward from the valve member and the inner seat member being urged toward the valve member.

One object of this invention is to provide a two-piece, double acting valve seat assembly which would overcome the aforementioned disadvantages of the prior art devices.

Still, one other object of this invention is to provide a two-piece, double acting valve seat assembly which will function equally well as an upstream or a downstream seat assembly in a valve.

Still, another object of this invention is to provide a two-piece, double acting valve seat assembly which can be actuated from an external fluid pressure source or from flow line pressure or from valve body fluid pressure.

Various other objects and advantages, and features of this invention will become apparent to those skilled in the art from the following discussion, taken in conjunction with the accompanying drawings, in which:

DESCRIPTION OF THE DRAWINGS

FIG. 1 is a cross-sectional view of a trunnion style ball valve employing the novel seat construction of this invention with portions of the valve cut away for clarity;

FIG. 2 is an enlarged cross-sectional view of an embodiment of the valve seat assembly of this invention illustrated with a portion of the valve body and valve member for the valve shown in FIG. 1, wherein the seat assembly is shown in the position it assumes when the flow line fluid pressure is greater than the valve body fluid pressure;

FIG. 3 is an enlarged cross-sectional view of the seat assembly shown in FIG. 2, wherein the seat assembly is shown in the position it assumes when the valve body fluid pressure is greater than the flow line fluid pressure;

FIG. 4 is a cross-sectional view of an embodiment of the seat assembly of this invention adapted for a gate valve and shown with a portion of a gate valve body;

FIG. 5 is an enlarged cross-sectional view of another embodiment of the seat assembly of this invention constructed to facilitate external pressure actuation thereof through a passageway in the outer seat member wherein the seat assembly is shown with a portion of a valve body and a ball valve member.

The following is a discussion and a description of specific embodiments of the two-piece, double acting valve seat assembly of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1 wherein a trunnion style and entry ball valve, indicated generally at 10, is shown with a pair of the seat assemblies of this invention mounted therein. Valve 10 includes a valve body 12 defining a valve chamber 14 with inlet and outlet flow passageways 16 and 18 in fluid communication with the valve chamber. Valve body 12 is shown as having a removably mounted tailpiece and flanges around the outer ends of the inlet and outlet passageways for mounting the valve in a pipeline or other conduit structures. A ball valve member 20 is rotatably mounted in valve chamber 14 for movement between open and closed positions. Ball valve member 20 is provided with a passageway 22 therethrough which can be aligned with inlet and outlet valve passageways 16 and 18. Ball valve member 20 is supported on one side by a stem 24 rotatably mounted through valve body 12 and on the opposite side by a trunnion shaft 26 rigidly mounted in valve body 12. Stem 24 is rotated to rotate ball valve member 20. An actuator such as the wrench in FIG. 1 is connected to stem 24 to rotate ball member 20 about an axis generally peripendular to the flow line of the inlet and outlet valve passageways.

The seat assemblies as shown in FIG. 1 are identical and indicated generally at 30 and 32 on upstream and downstream sides of the valve respectively. Seat assemblies 30 and 32 are mounted in recesses or seat pockets located around the flow passageways which open into the valve chamber 14. Recesses or seat pockets are identically shaped and open in an opposing facing relation. Inasmuch as the seat assemblies and seat pockets or recesses are identical it is sufficient for purposes of explanation to refer to FIG. 2 wherein the upstream seat assembly 30 is shown along with a portion of valve body 12 and a portion of ball valve member 20. Upstream seat pocket includes a pair of parallel stepped annular surfaces with the largest diameter outer annular surface 34 joining valve chamber 14 and connecting to a smaller diameter inner annular surface 36 by a radially disposed surface 38. A radially disposed seat pocket outer end surface 40 connects inner annular surface 36 with the bore of inlet passageway 16.

Upstream seat assembly 30 and downstream seat assembly 32 are identical so for convenience here only the upstream seat assembly 30 will be described in full detail. The upstream seat assembly 30 includes an annular outer seat member indicated generally at 42 which has the exterior thereof shaped to fit into the seat pocket in a nesting relation and which also has a groove in a face portion thereof to mount an annular seat member indicated generally at 44. The exterior of outer seat member 42 includes a large diameter outer cylindrical surface 46 extending outward relative to the valve member from a face portion of the seat member and connected by a radially disposed surface 50 to a smaller diameter inner cylindrical surface 48 which extends to the outer end surface 52 of the seat member. Seat member outer end surface 52 connects inner cylindrical surface 48 with the seat member annular interior bore 54. The face portion of seat member 42 includes an inclined surface 56 extending from bore 54 inwardly toward valve member 20 and radially outwardly from bore 54. Inclined surface 56 contains the groove mounting inner seat member 44. A radially disposed seat inner end surface 58 extends radially outward from the outer portion of the groove to outer cylindrical surface 46. The groove in outer seat member 42 is defined by an inner cylindrical surface 60 co-axial with the seat bore 54 and extending outward from an intersection with inclined surface 56, a small diameter inner annular surface 62 facing cylindrical surface 60 in a parallel relation, a larger diameter outer annular surface 64 substantially spaced radially outward of cylindrical surface 60 and intersecting radially disposed outer face surface 58. A radially disposed intermediate surface 66 joins surface 64 and surface 62 at a mid-point of the groove as shown clearly. This groove is comprised of a relatively narrow portion between surfaces 60 and 62 and a wider portion between surface 60 and surface 64. The groove bottom or closed end is indicated at surface 68. A passageway 70 connects the groove at groove bottom 68 to a mid-portion of surface 48 on the periphery of the outer seat member 42. A plurality of such passageways can be provided in a spaced relation around outer seat member 42. A fluid passageway 71 from the exterior of valve body 12 joins the seat pocket at a mid-point of surface 36. A passageway access plug 73 is mounted in valve body 12 at the outer opening of passageway 71.

Inner seat member 44 is an annular member with a cross-sectional shape generally conforming to the shape of the groove in outer seat member 42 and having a face seal on its inner side to contact ball valve member 20. Inner seat member 44 includes an inner annular surface 72, an outer cylindrical surface 74 spaced a small distance from surface 72, and parallel thereto, and another parallel large diameter outer cylindrical surface 76, a radially disposed surface 78 connecting adjoining ends of surfaces 74 and 76 and a radially disposed surface 80 defining the narrow end of inner seat member 44 and connecting surfaces 72 and 74. The face portion of inner seat member 44 is defined by an inclined surface 82 joining surfaces 72 and 76 with the inclined surface being interrupted by a face seal groove which receives and mounts an annular face seal 84 therein. An inner seat member fluid seal is provided in the form of an O-ring 86 mounted in a groove in cylindrical surface 68. Inner seat member seal 86 functions as a fluid seal between the narrow portion of inner seat member 44 and surface 62. Inner seat member 44 is freely movable in the groove in axial alignment with the valve bore as can be seen in comparing FIG. 2 with FIG. 3.

Outer seat member 42 has a fluid seal around peripheral portions of its outer portion with the seals being a pair of O-rings 88 and 90 mounted in grooves around the perimeter of outer seat member 42 with peripheral portions of the O-rings contacting seat pocket annular surface 36 as shown. O-rings 88 and 90 are spaced to lie on opposite sides of passageway 71 during normal use of the valve. A wave spring 92 is positioned around outer seat member 42 between surface 50 of the seat member and surface 38 of the seat pocket to urge seat member 42 toward valve member 20.

FIG. 2 illustrates the seat assembly in the position it assumes when fluid pressure in the flow line is greater than the fluid pressure in valve chamber 14. In this position face seal 84 is in contact with the sealing surface of valve member 20, and inner seat member end 80 is in contact with the groove bottom 68. The forces involved in displacing the seat members are the result of pressure acting over specific areas of the structure and for this reason specific areas of the structure are indicated by the capital letter "A", which designates an area taken from the valve bore to some specific point. The force acting on seat assembly 30 tending to urge it toward valve member 20 is created by line pressure fluid acting over the differential area as defined by the area between A1 and A2 less the force created by the body fluid pressure acting over the differential area as defined by the area between A1 less A4. Where the body fluid pressure is negligible or substantially zero relative to the flow line fluid pressure, then the second component in the preceding sentence is zero. Spring 92 also urges outer seat member 42 in the direction of valve member 20 continuously regardless of the fluid pressure in the flow line or the valve body. Obviously, the greater the differential pressure between the flow line and the valve body the greater the force urging the seat members toward the valve member 20.

Fluid-tight sealing is accomplished by cooperation of O-rings 88 and 90 sealing between outer seat member 42 and recess annular surface 36 in conjunction with O-ring 86 sealing between the seat members and face seal ring 84 sealing between inner seat member 44 and valve member 20. In the event of leakage in any of these seals, an emergency sealing compound can be injected into the seat assembly through external passageway 71 in body 12 which connects with passageway 70 in outer seat member 42.

FIG. 3 illustrates the valve seat assembly of this invention in the position it assumes when the valve body fluid pressure is greater than the flow line fluid pressure by an amount sufficient to cause actuation of the seat assembly in a mode alternate to that shown in FIG. 2. Outer seat member 42 is positioned with its outer end surface 52 abutting seat pocket outer radially disposed surface 40. Inner seat member 44 is positioned with face seal 84 in contact with valve member 20 and outer end 80 is in a spaced relation to groove end 68. The force tending to urge inner seat member 44 toward valve member 20 is caused by the body fluid pressure in valve chamber 14 acting over a differential area defined by A4 minus A3 which is opposed by flow line fluid pressure acting over the differential area as defined by A2 minus A4. The force urging outer seat member 42 into the outer or bottom portion of the seat pocket is created by body fluid pressure acting over the differential area as defined by A1 minus A2 less the force of spring 92. The force urging outer seat member 42 outward is opposed by flow line fluid pressure also acting over the differential area of the seat member as defined by A1 minus A2. Because the body fluid pressure is greater than the flow line fluid pressure the overall resultant force acting on seat member 42 urges it outward or to the left as it is shown in FIG. 3. For this to take place the pressure differential must be enough to create a force sufficient to compress wave spring 92 and displace outer seat member 42 to bring seat surface 52 into contact with recessed surface 40. Obviously, the higher the body fluid pressure above the flow line pressure the larger the force urging seat member 42 outward and seat member 44 toward valve member 20.

It is to be noted that the seat assembly of this invention can be actuated by artificially raising and lowering the fluid pressure inside valve chamber 14 to relax or engage same. This can be done by using an external pressure source such as a pump or pressurized fluid container or the like and connecting it with the valve chamber by a suitable port such as the body drain passageway indicated at 96 and shown in dashed lines in FIG. 1. Artificially raising and lowering the pressure in valve chamber 14 to a pressure substantially above or below the flow line pressure will have the same effect on the valve seat assembly as if the body pressure was not artificially raised or lowered. The advantage in controlling and regulating the pressure in valve chamber 14 is that a fluid-tight seal can be maintained by the seat assembly even though the differential between the flow line pressure and the valve chamber pressure is not sufficient to keep enough force on the seat assembly for adequate sealing. Also, another advantage of doing this is to assure sealing for a valve used in a low pressure service where the flow line pressure or body fluid pressure is not sufficient to apply adequate force to the seat assembly to accomplish fluid-tight sealing.

FIG. 4 shows the novel seat assembly of this invention utilized in a gate valve wherein a portion of the gate valve body 100 is shown along with a portion of the gate 102. As in the ball valve configuration, the seat pocket or recess is open to the valve bore 104. An outer seat member 106 is positioned in the recess or seat pocket with an inner seat member 108 mounted in a groove in the face portion of outer seat member 106. Inner seat member 108 is provided with a face seal ring 110 for contacting the sealing surface of gate 102. Seat members 106 and 108 are shaped substantially the same as the seat members described in the paragraphs above, except for the face portions thereof which have planar surfaces lying in a plane substantially perpendicular to the sealing face of gate 102. Outer seat member 106 is provided with a pair of spaced peripheral seal members 112 and 114 located around an outer end portion of the seat pocket. Inner seat member 108 is provided with a peripheral seal 116 around an outer portion thereof for sealing between inner seat member 108 and outer seat member 106 in the narrow portion of the groove. The general function, operation, and features of the seat assembly shown in FIG. 4 are the same as the seat assembly shown in FIGS. 2 and 3, thus will not be repeated to avoid repetition.

When there is substantially the same fluid pressure on opposite sides of the seat assembly then the seat assembly will assume the position as shown in FIG. 2 with wave spring 92 urging both seat members in the direction of valve member 20. In this unique and unusual equal pressure condition spring 92 would be the only force on the seat assembly for urging it to a sealing position. Generally in practice it has been found that this condition occurs infrequently regardless of whether the valve is open or closed.

FIG. 5 shows another embodiment of the double acting valve seat assembly of this invention which is very similar to that shown and described in FIG. 2 except it is constructed for external actuation of the seat assembly. Because of the common and substantially identical structure in FIGS. 2, 3, and 5, the common parts of the seat assembly shown in FIG. 5 have the same reference numerals as in FIGS. 2 and 3 followed by the capital letter "A". Outer seat member 42A is identical to that shown in FIGS. 2 and 3 and described in conjunction therewith. Outer seat member 42A is substantially identical to the outer seat member shown in FIGS. 2 and 3, except that an additional seal member is provided in the form of an O-ring 120 mounted in a groove in cylindrical surface 60A. O-ring 120 seals between the inner side of seat member 44A and groove cylindrical surface 60A. O-ring 86A seals between the outer perimeter of inner seat member 44A and annular surface 62A in the outer narrow portion of the groove. Passageway 70A through outer seat member 42A allows fluid to be used as a medium for displacing inner seat member 44A relative to outer seat member 42A. Passageway 71A leading to the exterior of valve body 12A is used to communicate with passagway 70A for controlling the fluid pressure in passageway 70A. An external fluid pressure source such as a pump or other resersably pressurized fluid source can be used to pressurize passageway 70A and 71A in order to position seat members 42A and 44A as desired. The pressure in passageway 70A can be raised above the flow line pressure and the valve chamber pressure to separate the seat members as shown. In an alternative mode of operation the pressure in passageway 70A can be reduced below the flow line pressure and valve chamber pressure to move the seat members together whereupon the pressure condition of the flow line and the valve chamber will displace the seat members as a unit depending upon which pressure is greater. The seat construction shown in FIG. 5 makes it possible to operate the valve seats from an external fluid pressure source which is desirable in application where the flow line pressure is not sufficient to actuate the seats, and in other applications where the characteristics of the lading would make it advantageous to be able to retract the inner seat member 44A to more freely turn valve member 20A.

In the use and operation of the two-piece, double acting valve seat assembly of this invention it is seen that same provides a unique double acting valve seat assembly which can be operated by fluid pressures in the flow line or fluid pressure in the valve body. In an alternative embodiment the double acting valve seat assembly can be actuated by pressure from a source external to the valve. Because of the novel construction of the valve seat assembly a positive pressure in either the valve chamber or the flow line passageway of the valve will actuate the seat assembly to achieve fluid-tight seal around the valve member. Additionally, it is to be noted that the two-piece, double acting seat assembly of this invention is not restricted to use with a ball valve but may be used in a gate valve of other types of valves if desired.

What is claimed is:

1. In a valve having a valve body with a valve chamber therein, upstream and downstream flow passageways formed in said valve body and being in fluid communication with said valve chamber, a valve member mounted in the valve chamber for movement between open and closed positions to control the flow of fluid through the valve, seat recesses formed in said valve body on the upstream and downstream sides of the valve member and a seat assembly mounted within each seat recess, said seat assemblies each comprising:
   (a) an annularly shaped metallic outer seat member extending into an outer peripheral wall portion of said seat recess, and a metallic inner seat member mounted with an inner side portion of said outer seat member for movement in longitudinal alignment with said flow passageways and having a non-metallic face seal on an inner side thereof engagable with said valve member,
   (b) a peripheral seal between an outer peripheral portion of said outer seat member and an outer peripheral portion of said seat recess,
   (c) an inner seat member seal on an outer peripheral portion of said inner seat member sealingly engaged with said outer member,
   (d) said outer seat member peripheral seal having a diameter greater than the diameter of said inner seat member seal and said face seal having a diameter between that of said outer seat peripheral seal and said inner seat member seal, such that when fluid pressure in an associated flow passageway is greater than fluid pressure in said valve chamber then said outer seal member and said inner seat member will be urged toward said valve member, and in a reverse condition when fluid pressure in said valve chamber is greater than fluid pressure in said associated flow passageway then said outer seat member is urged away from said valve member and said inner seat member is urged toward said valve member, and
   (e) an auxiliary passageway including a first passageway portion through said valve body to said seat recess at a location adjacent an outer peripheral portion of said outer seat member and a second passageway portion through said outer seat member from said outer peripheral portion to an inner peripheral portion of said inner seat member, said auxiliary passageway in use communicating a seat sealant fluid through said first and second passageway portions to said inner peripheral portion of said inner seat member such that the seat sealant fluid can flow around the inner periphery of said inner seat member to said valve member for sealing between said valve member and both of said seat members.

2. The valve of claim 1 wherein:
   (a) said valve is a ball valve having a ball valve member mounted for rotation on trunnions about an axis generally perpendicular to said passageways, and
   (b) said ball valve further includes a compression spring means between said body and said outer seat member in each of said seat assemblies to urge said outer seat member toward said valve member to assist in establishing an initial seal between said face seal and said ball valve member.

3. The valve of claim 2, wherein:
   (a) said outer seat member has an annular groove in a face portion thereof with said inner seat member mounted in said groove,
   (b) said groove having a deep and radially relatively narrow portion connecting with a wider portion at a face portion of said outer seat member,
   (c) said inner seat member having a radially narrow annular portion positioned in a radially narrow portion of said groove in a nesting relation and having said inner seat member seal on said outer seat member.

4. The valve of claim 1, wherein:
   (a) said valve is a gate valve having a gate member mounted for movement between open and closed positions,
   (b) said gate valve further includes a compression spring between said valve body and said outer seat member to urge said outer seat member toward said gate valve member for assisting in establishing an initial seal between said face seal and said gate valve member.

5. The valve of claim 1, wherein, said valve body has an auxiliary fluid passageway from the exterior thereof into said valve chamber for in use connecting with an auxiliary fluid pressure source for applying external pressure to said valve chamber to raise pressure therein above fluid pressure in said flow passageway in order to urge said outer seat member away from said valve member and said inner member toward said valve member.

6. In a valve having a valve body with a valve chamber therein, upstream and downstream flow passageways formed in said valve body and being in fluid communication with said valve chamber, a valve member mounted in said valve chamber for movement between open and closed positions to control the flow of fluid through the valve, seat recesses formed in the valve body on the upstream and downstream sides of the valve member and a seat assembly mounted within each recess, each seat assembly comprising:
   (a) an annularly shaped metallic outer seat member positioned in an outer portion of said recess, and having an annular groove in a face portion thereof adjoining said valve member,
   (b) an annularly shaped metallic inner seat member movably mounted in said annular groove and having an annular non-metallic face seal extending from an inner annular face portion thereof to rest in sealing contact with said valve member,
   (c) a peripheral seal around an outer portion of said outer seat member resting in sealing contact with an outer peripheral portion of said recess,
   (d) a peripheral seal around an outer portion of said inner seat member in sealing contact with an outer peripheral portion of said groove, said inner seat member peripheral seal cooperating with said face seal, said valve member, and said outer seat member peripheral seal to provide a fluid-tight seal between said valve chamber, said valve member and an associated flow passageway, and (e) said annular groove has a stepped outer portion including a small diameter portion and a large diameter portion, and said inner seat member has a complementary stepped portion including a small diameter portion and a large diameter portion with said peripheral seal around said inner seat member being around said small diameter portion thereof;

(f) said face seal and said outer seat member peripheral seat being sizes such that a differential area therebetween is greater on the side thereof exposed to fluid in said passageways than on the side thereof exposed to fluid in said valve chamber, such that when fluid pressure in an associated passageway is greater than fluid pressure in said valve chamber then said outer seat member and said inner seat member will be urged toward said valve member, (g) said face seal and said inner seat member peripheral seal are sized such that a differential area therebetween is greater on the side thereof exposed to fluid in said valve chamber than on the side thereof exposed to fluid in the associated flow passageway such that when fluid pressure in said valve chamber is greater than fluid pressure in said associated flow passageway then said outer seat member is urged into an outer portion of the associated recess and said inner seat member is urged toward said valve member.

7. The valve of claim 6 wherein:

(a) said valve is a ball valve having a ball valve member mounted for rotation on trunnions about an axis generally perpendicular to said passageways, (b) said ball valve further includes a compression spring means between said body and said outer seat member in each of said seat assemblies to urge said outer seat member toward said valve member to assist in establishing an initial seal between said face seal and said ball valve member, (c) said outer seat member has an annular groove in a face portion thereof with said inner seat member mounted in said groove, (d) said groove having a deep and radially relatively narrow portion connecting with a wider portion at a face portion of said outer seat member, and (e) said inner seat member having a radially narrow annular portion positioned in a radially narrow portion of said groove in a nesting relation and having said inner seat member seal on said outer seat member.

* * * * *